United States Patent

Nose

(10) Patent No.: US 11,404,687 B2
(45) Date of Patent: *Aug. 2, 2022

(54) CATHODE MIXTURE AND METHOD FOR PRODUCING THE SAME

(71) Applicant: TOYOTA JIDOSHA KABUSHIKI KAISHA, Toyota (JP)

(72) Inventor: Masafumi Nose, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 7 days.

This patent is subject to a terminal disclaimer.

(21) Appl. No.: 16/040,216

(22) Filed: Jul. 19, 2018

(65) Prior Publication Data

US 2019/0051890 A1 Feb. 14, 2019

(30) Foreign Application Priority Data

Aug. 9, 2017 (JP) .............................. JP2017-154670
Jun. 1, 2018 (JP) .............................. JP2018-106334

(51) Int. Cl.
*H01M 4/04* (2006.01)
*H01M 4/36* (2006.01)
(Continued)

(52) U.S. Cl.
CPC ....... *H01M 4/1397* (2013.01); *H01M 4/0435* (2013.01); *H01M 4/13* (2013.01);
(Continued)

(58) Field of Classification Search
CPC ............... H01M 4/1397; H01M 4/625; H01M 10/0562; H01M 4/13; H01M 4/38;
(Continued)

(56) References Cited

U.S. PATENT DOCUMENTS 9,865,873 B2 1/2018 Nagata et al.
2010/0151335 A1* 6/2010 Senga ................. H01M 10/052
429/322
(Continued)

FOREIGN PATENT DOCUMENTS

CN 102823049 A 12/2012
CN 105308774 A 2/2016
(Continued)

OTHER PUBLICATIONS

Suzuki et al.; "Composite Sulfur Electrode for All-solid-state Lithium-sulfur Battery with Li2S—GeS2—P2S5-based Thio-LISICON Solid Electrolyte;" Electrochemistry; Dec. 27, 2017; pp. 1-5; vol. 86, No. 1; The Electrochemical Society of Japan.
(Continued)

*Primary Examiner* — Christian Roldan
(74) *Attorney, Agent, or Firm* — Oliff PLC

(57) ABSTRACT

An object of the present disclosure is to produce a cathode mixture capable of increasing the charge-discharge capacity of a sulfur battery. The present disclosure achieves the object by providing a cathode mixture used for a sulfur battery and a method for producing the same, wherein the cathode mixture is produced by a mechanical milling treatment of a raw material mixture including $Li_2S$ and $M_xS_y$, wherein M is selected from P, Si, Ge, B, Al, or Sn, and x and y are integers that confer an electroneutrality with respect to S according to a kind of M; a cathode active material including a sulfur simple substance; and a conductive aid including a carbon material.

2 Claims, 6 Drawing Sheets

(51) Int. Cl.

| | | |
|---|---|---|
| *H01M 4/62* | (2006.01) | |
| *H01M 4/02* | (2006.01) | |
| *H01M 4/1397* | (2010.01) | |
| *H01M 10/0562* | (2010.01) | |
| *H01M 4/13* | (2010.01) | |
| *H01M 4/38* | (2006.01) | |

(52) U.S. Cl.
CPC ............. *H01M 4/364* (2013.01); *H01M 4/38* (2013.01); *H01M 4/625* (2013.01); *H01M 10/0562* (2013.01); *H01M 2004/028* (2013.01); *H01M 2300/0068* (2013.01); *H01M 2300/0091* (2013.01)

(58) Field of Classification Search
CPC ............... H01M 4/0435; H01M 4/364; H01M 2300/0068; H01M 2004/028; H01M 2300/0091; H01M 4/62; H01M 4/628; H01M 10/052; H01M 2004/021
USPC ......................................................... 429/129
See application file for complete search history.

(56) References Cited

U.S. PATENT DOCUMENTS

| | | | | |
|---|---|---|---|---|
| 2012/0301778 | A1* | 11/2012 | Trevey | H01M 4/628 429/178 |
| 2013/0040208 | A1 | 2/2013 | Kanno et al. | |
| 2015/0162614 | A1* | 6/2015 | Koshika | H01M 4/13 429/189 |
| 2016/0118660 | A1 | 4/2016 | Nagata et al. | |
| 2016/0351964 | A1 | 12/2016 | Jeong et al. | |
| 2017/0317337 | A1 | 11/2017 | Hayashi et al. | |
| 2017/0317381 | A1* | 11/2017 | Kim | H01M 10/0525 |
| 2018/0069262 | A1* | 3/2018 | Utsu | H01M 4/62 |
| 2019/0051890 | A1 | 2/2019 | Nose | |
| 2019/0372106 | A1 | 12/2019 | Nose | |
| 2019/0372107 | A1 | 12/2019 | Nose et al. | |
| 2020/0168897 | A1 | 5/2020 | Ikeda et al. | |

FOREIGN PATENT DOCUMENTS

| | | |
|---|---|---|
| JP | 2011-029139 A | 2/2011 |
| JP | 2011-181260 A | 9/2011 |
| JP | 2012-069305 A | 4/2012 |
| JP | 5388069 B2 | 1/2014 |
| JP | 5388069 B2 * | 1/2014 |
| JP | 5445809 B1 | 3/2014 |
| JP | 2014-160572 A | 9/2014 |
| JP | 2015-005452 A | 1/2015 |
| JP | 2015-176849 A | 10/2015 |
| JP | 2017-084686 A | 5/2017 |
| JP | 2017-091810 A | 5/2017 |
| JP | 2017-168434 A | 9/2017 |
| JP | 2019-033067 A | 2/2019 |
| JP | 2019-212444 A | 12/2019 |
| WO | 2011/118801 A1 | 9/2011 |
| WO | 2016/063877 A1 | 4/2016 |

OTHER PUBLICATIONS

Choi et al.; "Performance improvement of all-solid-state Li—S batteries with optimizing morphology and structure of sulfur composite electrode;" Journal of Alloys and Compounds; 2017; pp. 787-794; vol. 723.

Aug. 3, 2020 Office Action issued in U.S. Appl. No. 16/420,418.

Tanibata et al., "A novel discharge-charge mechanism of a S—P2S5 composite electrode without electrolytes in all-solid-state Li/S batteries," Journal of Materials Chemistry A, 2017, vol. 5, pp. 11224-11228.

Jan. 25, 2021 Notice of Allowance issued in U.S. Appl. No. 16/420,418.

Dec. 3, 2021 Office Action issued in U.S. Appl. No. 16/418,177.

U.S. Pub. cite 2016/0118660A1 cited in the Information Disclosure Statement filed on Feb. 11, 2021.

Jan. 19, 2022 Notice of Allowance issued in U.S. Appl. No. 16/687,886.

Apr. 28, 2022 Office Action issued in U.S. Appl. No. 16/418,177.

* cited by examiner

CATHODE MIXTURE AND METHOD FOR PRODUCING THE SAME

TECHNICAL FIELD

The present disclosure discloses a cathode mixture used for a sulfur battery, and a method for producing the same.

BACKGROUND ART

In accordance with the rapid spread of information-related apparatuses and communication devices such as a personal computer, a video camera, and a portable telephone in recent years, the development of a battery used for the power source thereof is regarded as important. Also in the automobile industry, the development of a battery with high performance and high capacity for electric vehicles or hybrid vehicles is in progress.

The development of a sulfur battery using sulfur as a cathode active material is in progress. The sulfur has a feature that the theoretical capacity thereof is extremely high as 1675 mAh/g. Also, in the field of a sulfur battery, an attempt has been made to improve the availability of the sulfur and to increase the charge-discharge capacity of a sulfur battery. Patent Literature 1 discloses a cathode mixture comprising a $Li_2S$—$P_2S_5$ based solid electrolyte, a cathode active material that is a sulfur simple substance, and a conductive material that is a carbon material. Patent Literature 1 describes a cathode mixture produced by mixing the following (a) to (c) with a planetary type ball mill, and an all solid state lithium-sulfur battery using the same: (a) as a solid electrolyte, a $Li_2S$—$P_2S_5$ based sulfide solid electrolyte preliminarily produced by a planetary type ball mill treatment, or a sulfide solid electrolyte preliminarily produced with a planetary type ball mill by using $Li_2S$, red phosphorous, and sulfur as starting materials, (b) sulfur as a cathode active material, and (c) Ketjen black as a conductive aid.

Also, Patent Literature 2 describes' a method for producing a cathode mixture by a mechanical milling method, using sulfur, acetylene black, and a $80Li_2S$—$20P_2S_5$ sulfide solid electrolyte preliminarily produced by using a planetary type ball mill, as starting materials.

Further Patent Literature 3 describes a method for producing a cathode mixture by step (1) of mixing (A) sulfur or a discharge product thereof, (B) a sulfur interfacial reaction improver preliminarily produced with a planetary type ball mill using $Li_2S$ and $P_2S_5$ as starting materials (composition ratio (molar ratio) of $Li_2S$:$P_2S_5$=65:35), and (C) a conductive material; and step (2) of mixing a $80Li_2S$—$20P_2S_5$ sulfide solid electrolyte preliminarily produced by using a planetary type ball mill, and the mixture obtained in step (1).

CITATION LIST

Patent Literatures

Patent Literature 1: Japanese Patent No. 5445809
Patent Literature 2: Japanese Patent Application Laid-Open (JP-A) No. 2011-181260
Patent Literature 3: JP-A No. 2014-160572

SUMMARY OF DISCLOSURE

Technical Problem

Since the availability of the sulfur is not sufficiently improved in conventional art, there is a need to further increase the charge-discharge capacity of a sulfur battery. The present disclosure has been made in view of the above circumstances, and a main object thereof is to provide a cathode mixture and a method for producing the same capable of improving the availability of the sulfur and increasing the charge-discharge capacity of the sulfur battery.

Solution to Problem

In order to achieve the object, the present disclosure provides a method for producing a cathode mixture used for a sulfur battery, wherein the cathode mixture is produced by a mechanical milling treatment of a raw material mixture including: $Li_2S$ and $M_xS_y$, wherein M is selected from P, Si, Ge, B, Al, or Sn, and x and y are integers that confer an electroneutrality with respect to S according to a kind of M, a cathode active material including a sulfur simple substance, and a conductive aid including a carbon material.

By the mechanical milling of a raw material mixture including: $Li_2S$ and $M_xS_y$, wherein M is selected from P, Si, Ge, B, Al, or Sn, and x and y are integers that confer an electroneutrality with respect to S according to a kind of M, a cathode active material including a sulfur simple substance, and a conductive aid including a carbon material, a cathode mixture in which excellent interfaces between the sulfur and the solid electrolyte and between the sulfur and the conductive aid are formed, may be produced.

Advantageous Effects of Disclosure

The present disclosure exhibits effects such that a cathode mixture capable of improving the availability of sulfur and increasing the charge-discharge capacity of a sulfur battery may be produced.

DESCRIPTION OF EMBODIMENTS

Figure 1:
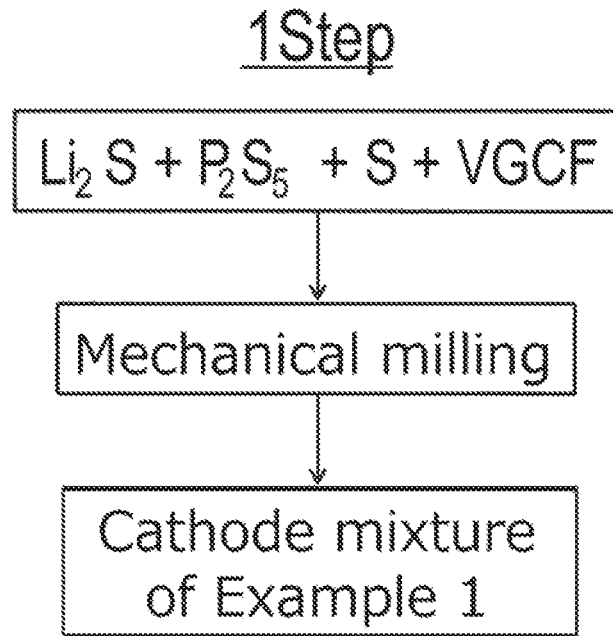
FIG. 1 is a diagram for explaining the flow of the method for producing in Example 1 of the present disclosure.

The cathode mixture and the method for producing the same of the present disclosure will be hereinafter described in detail.

In the cathode mixture and the method for producing the same of the present disclosure, the cathode mixture is used for a sulfur battery, and featured by the cathode mixture being produced by a mechanical milling treatment of a raw material mixture including: $Li_2S$ and $M_xS_y$, wherein M is selected from P, Si, Ge, B, Al, or Sn, and x and y are integers that confer an electroneutrality with respect to S according to a kind of M, a cathode active material including a sulfur simple substance, and a conductive aid including a carbon material.

By carrying out a mechanical milling treatment of a raw material mixture including: $Li_2S$ and $M_xS_y$, wherein M is selected from P, Si, Ge, B, Al, or Sn, and x and y are integers that confer an electroneutrality with respect to S according to a kind of M, a cathode active material including a sulfur simple substance, and a conductive aid including a carbon material, a cathode mixture in which excellent interfaces between the sulfur and the solid electrolyte and between the sulfur and the conductive aid are formed, may be produced.

The reason why the charge-discharge capacity of a sulfur battery may be increased by producing a cathode mixture of a sulfur battery by the above described method for producing is presumed as follows.

When the sulfur simple substance is used as a cathode active material of an all solid state battery, a charge-discharge reaction proceeds only at a three-phase interface where a solid electrolyte that forms a Li ion path and a conductive aid that forms an electron path coexist on the surface of the sulfur that is an active material.

In the present disclosure, since the cathode mixture is produced by a mechanical milling treatment of a raw material mixture including: $Li_2S$ and $M_xS_y$, wherein M is selected from P, Si, Ge, B, Al, or Sn, and x and y are integers that confer an electroneutrality with respect to S according to a kind of M, a cathode active material including a sulfur simple substance, and a conductive aid including a carbon material, the excellent three-phase interface of the solid electrolyte and the conductive aid to the sulfur may be formed.

Accordingly, it is presumed that the charge-discharge reaction may be proceeded upon charge and discharge so as to be capable of improving the availability of the sulfur and increasing the charge-discharge capacity of the sulfur battery.

Incidentally, it is generally thought that, in a cathode active material of a sulfur simple substance, a reaction in which S becomes $Li_2S$ via $Li_2S_2$ proceeds upon discharge.

As shown in the later described Example, the effect that the cathode mixture produced by a mechanical milling treatment of a raw material mixture including: $Li_2S$ and $M_xS_y$, wherein M is selected from P, Si, Ge, B, Al, or Sn, and x and y are integers that confer an electroneutrality with respect to S according to a kind of M, a cathode active material including a sulfur simple substance, and a conductive aid including a carbon material is capable of exhibiting high charge-discharge capacity, was confirmed for the first time.

Patent Literatures 1 to 3 disclose a production of a cathode mixture by mixing the followings by a mechanical milling such as a ball milling: a sulfide solid electrolyte preliminarily produced by using a planetary type ball mill, a sulfur simple substance and a discharge product thereof those are cathode active materials, and a conductive aid. However, unlike the present disclosure, these literatures do not describe the production of a cathode mixture by a mechanical milling treatment of a raw material mixture including: $Li_2S$ and $M_xS_y$, wherein M is selected from P, Si, Ge, B, Al, or Sn, and x and y are integers that confer an electroneutrality with respect to S according to a kind of M, a cathode active material including a sulfur simple substance, and a conductive aid including a carbon material.

The effects of the cathode mixture produced by a mechanical milling treatment of a raw material mixture including: $Li_2S$ and $M_xS_y$, wherein M is selected from P, Si, Ge, B, Al, or Sn, and x and y are integers that confer an electroneutrality with respect to S according to a kind of M, a cathode active material including a sulfur simple substance, and a conductive aid including a carbon material, that the availability of the sulfur in the cathode mixture may be improved and that the charge-discharge capacity may be increased are phenomena and effects cannot be expected from the conventional art of Patent Literatures 1 to 3.

The reason why the present disclosure exhibits phenomena and effects cannot be expected from the conventional art of Patent Literatures 1 to 3 is presumed as follows.

In the process of synthesizing a solid electrolyte by a mechanical milling treatment of a raw material mixture including: $Li_2S$ and $M_xS_y$, wherein M is selected from P, Si, Ge, B, Al, or Sn, and x and y are integers that confer an electroneutrality with respect to S according to a kind of M, a cathode active material including a sulfur simple substance, and a conductive aid including a carbon material, a part of the sulfur simple substance or a lithium polysulfide ($Li_xS$) generated by the reaction of the sulfur simple substance and $Li_2S$ is thought to be incorporated into the structure of the solid electrolyte. After that, the sulfur simple substance and the lithium polysulfide reach to the solid-solution limit in the solid electrolyte, the sulfur simple substance and $Li_2S$ are redeposited on the surface of the solid electrolyte, and the contacts between the solid electrolyte and the sulfur simple substance and between the solid electrolyte and the $Li_2S$ are improved. Thus, it is presumed that the availability of the sulfur in the cathode mixture is improved and the charge-discharge capacity is increased.

Meanwhile, in the conventional art, it is presumed that the above described phenomena do not occur since the cathode mixture is produced by mixing the followings by a mechanical milling such as a ball milling: a sulfide solid electrolyte preliminarily produced by using a planetary type ball mill, a sulfur simple substance and a discharge product thereof those are cathode active materials, and a conductive aid.

Also, when the raw material mixture in the present disclosure includes $M^1_xS_y$ and $M^2_xS_y$ ($M^1$ and $M^2$ are different elements) as the $M_xS_y$, and the $M^1_xS_y$ is $P_2S_5$, an effect that a capacity decrease at high current density may be suppressed, may be exhibited. Specifically, it is as follows. Firstly, in the present disclosure as described above, by carrying out a mechanical milling treatment of the raw material mixture including $Li_2S$ and $M_xS_y$, the cathode active material including a sulfur simple substance, and the conductive aid including a carbon material, the dispersibility of sulfur is improved so that the availability of sulfur in the cathode mixture is improved. When $Li_2S$ and $M_xS_y$, the cathode active material including a sulfur simple substance, and the conductive aid including a carbon material are mixed, a part of the sulfur simple substance or a lithium polysulfide ($Li_xS$) generated by the reaction of the sulfur simple substance and $Li_2S$ is incorporated into the structure of the solid electrolyte, as described above. On this occasion, if it is rich in sulfur, the sulfur is saturated and is deposited on the surface of the solid electrolyte in some cases. Accordingly, the sulfur incorporated into the structure of the solid electrolyte functions as the solid electrolyte, while the deposited sulfur functions as the cathode active material. Therefore, as the result, the availability of the sulfur is thought to be improved.

In the present disclosure, the sulfur is highly reactive with particularly $P_2S_5$ so that a network is easily formed. This is thought to be caused by the highly reactive cross-linked sulfur in the $P_2S_5$ conformation being easily chemically reacted by being mixed with the sulfur. Incidentally, in the conventional methods for producing a cathode mixture, since the solid electrolyte and the sulfur simple substance are mechanically mixed, the reaction between the solid electrolyte and the sulfur simple substance does not occur usually. The reason is thought to be because, since $P_2S_5$ and $Li_2S$ those are starting materials of the solid electrolyte are reacted in advance, the reaction between $P_2S_5$ and the sulfur does not occur even if they are mixed with the sulfur simple substance thereafter.

Meanwhile, in the present disclosure, a new problem was discovered; even though the charge-discharge capacity is increased by improving the dispersibility of the sulfur in the cathode mixture and improving the availability of the sulfur, the capacity is decreased when discharged at high current density. Specifically, when $M_xS_y$ is $P_2S_5$, $Li_2S$ becomes excessive in the configuration of the ion conductor so that the ion conductivity is decreased (the resistance is increased) in some cases, as the result of a part of $P_2S_5$, among $Li_2S$ and $P_2S_5$ included in the ion conductor, being reacted with the sulfur of the active material and incorporated into the active material layer. Accordingly, in the present disclosure, a new problem was discovered; the capacity at low current density may be increased by a part of $P_2S_5$ being reacted with the sulfur to be an active material, whereas the capacity is remarkably decreased when the load is increased (at high current density). Incidentally, the capacity is slightly decreased when discharged at low current density so that the above described problem in the present disclosure that the capacity is remarkably decreased at high current density cannot be easily arrived at. With respect to the above described problem, in the present disclosure, the excessive $Li_2S$ in the configuration of the ion conductor is reacted with the $M^1_xS_y$ so that the capacity decrease at high current density may be suppressed by the raw material mixture including $M^1_xS_y$ and $M^2_xS_y$ ($M^1$ and $M^2$ are different elements) as the $M_xS_y$, the $M^1_xS_y$ being $P_2S_5$, and the $M^2$ in the $M^2_xS_y$ being selected from Si, Ge, B, Al, or Sn.

The cathode mixture and the method for producing the same will be hereinafter described.

1) Raw Material Mixture

The raw material mixture is a mixture including starting materials of the sulfide solid electrolyte, a cathode active material including a sulfur simple substance, and a conductive aid including a carbon material. That is, the raw material mixture includes $Li_2S$ and $M_xS_y$ (M is selected from P, Si, Ge, B, Al, or Sn, and x and y are integers that confer an electroneutrality with respect to S according to a kind of M), a cathode active material including a sulfur simple substance, and a conductive aid including a carbon material.

(i) Starting Materials of Sulfide Solid Electrolyte

The sulfide solid electrolyte produced from the starting materials of the sulfide solid electrolyte includes an ion conductor including at least Li and S, and includes $Li_2S$ and $M_xS_y$. M is selected from P, Si, Ge, B, Al, or Sn, and x and y are integers that confer an electroneutrality with respect to S according to a kind of M. Incidentally, M may be one kind selected from P, Si, Ge, B, Al, or Sn, or may be two kinds or more selected from P, Si, Ge, B, Al, or Sn, but the former is preferable. Specific examples of $M_xS_y$ may include $P_2S_5$, $SiS_2$, $GeS_2$, $B_2S_3$, $Al_2S_3$, and $SnS_2$. Examples of the combination of $Li_2S$ and $M_xS_y$ may include $Li_2S$—$P_2S_5$, $Li_2S$—$SiS_2$, $Li_2S$—$GeS_2$, $Li_2S$—$B_2S_3$, $Li_2S$—$Al_2S_3$, and $Li_2S$—$SnS_2$.

Also, two or more of $M_xS_y$ (M is selected from P, Si, Ge, B, Al, or Sn, and x and y are integers that confer an electroneutrality with respect to S according to a kind of M) are selected from the above, and a plurality of $M_xS_y$ is used in some cases. Specific examples may include $Li_2S$—$P_2S_5$—$GeS_2$, $Li_2S$—$P_2S_5$—$SiS_2$, and $Li_2S$—$SiS_2$—$Al_2S_3$.

In the present disclosure, the raw material mixture may include a plurality of $M_xS_y$. That is, as $M_xS_y$, $M^1_xS_y$ and $M^2_xS_y$ ($M^1$ and $M^2$ are different elements) may be included. The $M^1$ here is selected from P, Si, Ge, B, Al, or Sn, and x and y are integers that confer an electroneutrality with respect to S according to the kinds of $M^1$ and $M^2$. $M^1$ is preferably P. That is, $M^1_xS_y$ is preferably $P_2S_5$. $M^1$ may be one kind selected from P, Si, Ge, B, Al, or Sn, or may be two kinds or more selected from P, Si, Ge, B, Al, or Sn, but the former is preferable. Specific examples of $M^1_xS_y$ may include $P_2S_5$, $SiS_2$, $GeS_2$, $B_2S_3$, $Al_2S_3$, and $SnS_2$. Meanwhile, $M^2$ is selected from P, Si, Ge, B, Al, or Sn, and x and y are integers that confer an electroneutrality with respect to S according to the kinds of $M^1$ and $M^2$. $M^2$ is preferably selected from Si, Ge, B, Al, or Sn. That is, $M^2_xS_y$ is preferably $SiS_2$, $GeS_2$, $B_2S_3$, $Al_2S_3$, or $SnS_2$, for example, above all, preferably $GeS_2$.

When $M^1_xS_y$ is $P_2S_5$, and $M^2_xS_y$ is $SiS_2$, $GeS_2$, $B_2S_3$, $Al_2S_3$, or $SnS_2$, the raw material mixture preferably includes $Li_2S$ and $P_2S_5$ at a predetermined rate. The raw material mixture preferably includes $Li_2S$ and $P_2S_5$ at a rate in a range of 60:40 to 90:10 in a molar ratio, and more preferably includes at a rate in a range of 70:30 to 90:10 in a molar ratio. Above all, preferably includes. $Li_2S$ and $P_2S_5$ at a rate of 84:16 in a molar ratio. Specifically, the rate of $Li_2S$ to the total of $Li_2S$ and $P_2S_5$ may be, for example, 70 mol % or more, may be 75 mol % or more, may be 80 mol % or more, may be 84 mol % or more, and may be 90 mol % or more. Also, the molar ratio of Li to P (Li/P) may be, for example, 2 or more, may be 4 or more, and may be 5 or more. Meanwhile, the molar ratio of Li to P (Li/P) may be, for example, 10 or less, may be 8 or less, and may be 6 or less. By $Li_2S$ and $P_2S_5$ being included at the above described rate, the problem may arise that $Li_2S$ becomes excessive in the configuration of the ion conductor so that the capacity at high current density is decreased. However, in the present disclosure, when the raw material mixture includes $M^1_xS_y$ ($P_2S_5$) and $M^2_xS_y$ ($M^2$ is an element selected from Si, Ge, B, Al, or Sn), the excessive $Li_2S$ may be reacted with the $M^2_xS_y$ so that the capacity decrease at high current density may be suppressed.

When the raw material mixture includes $M^1_xS_y$ ($P_2S_5$) and $M^2_xS_y$ ($M^2$ is an element selected from Si, Ge, B, Al, or Sn), the molar ratio of $M^2$ to P ($M^2$/P) is preferably 0.08 or more and 1.23 or less. The reason therefor is to suppress the capacity decrease at high current density effectively. $M^2$/P may be, for example 0.34 or more, and may be 0.54 or more. Meanwhile, $M^2$/P may be, for example 1.00 or less, and may be 0.79 or less. In the present disclosure, the added weight of $P_2S_5$ and $M^2_xS_y$ included in the raw material mixture is preferably determined so that $M^2$ to P ($M^2$/P) in the cathode mixture is in the above described range.

When the raw material mixture includes $M^1_xS_y$ ($P_2S_5$) and $M^2_xS_y$ ($M^2$ is an element selected from Si, Ge, B, Al, or Sn), in the obtained cathode mixture, it is preferable that an intensity ratio of a diffraction peak of the $Li_2S$ (111) surface to a diffraction peak of the $M^2_xS_y$ (111) surface is 0.9 or more and 10.4 or less. The intensity ratio may be, for example, 1.0 or more and may be 2.0 or more. Meanwhile, the intensity ratio may be, for example, 7.0 or less, and may be 5.0 or less. The intensity ratio here may be determined from the following formula:

Intensity ratio=diffraction peak intensity of $Li_2S$(111) surface/diffraction peak intensity of $M^2_xS_y$(111) surface Specifically, when $M^2_xS_y$ is $GeS_2$, the intensity ratio may be determined from:

Intensity ratio=$I(27°)$–$I(26°)$/$I(15.5°)$–$I(14.5°)$

Incidentally, for the diffraction peaks (such as $I(27°)$) used in the above formula, an average value of the peak intensity in a range of ±0.05° may be used.

Further, other electrolyte such as a lithium salt such as LiCl LiI and LiBr and $Li_3PO_4$ may be added to the starting material of the sulfide solid electrolyte.

The sulfide solid electrolyte usually has Li ion conductivity.

The ion conductor includes at least Li and S. The ion conductor is not particularly limited if it includes at least Li and S, and examples thereof may include an ion conductor having an ortho-composition. The ortho here is generally referred to those having the highest hydration degree among the oxo-acid obtained by hydrating the same oxide. In the present disclosure, the crystal composition of a sulfide to which the $Li_2S$ is added the most is referred to as an ortho-composition. For example, in $Li_2S$—$P_2S_5$ based, $Li_3PS_4$ corresponds to the ortho-composition.

Also, the phrase "having an ortho-composition" includes not only a strict ortho-composition but also compositions in the vicinity thereof. Specifically, is referred to those including an anion structure ($PS_4^{3-}$ structure) of the ortho-composition as a main component. The rate of the anion structure of the ortho-composition to the total anion structure in the ion conductor is preferably 60 mol % or more, more preferably 70 mol % or more, further preferably 80 mol % or more, and particularly preferably 90 mol % or more. Incidentally, the rate of the anion structure of the ortho-composition may be determined by, for example, a Raman spectroscopy, a NMR, and an XPS.

Also, for example, for a sulfide solid electrolyte of $Li_2S$—$P_2S_5$ based, the rate of $Li_2S$ and $P_2S_5$ for obtaining the ortho-composition is $Li_2S$:$P_2S_5$=75:25 on a molar basis. In the present disclosure, the raw material mixture preferably includes $Li_2S$ and $P_2S_5$ at a rate in a range of 60:40 to 90:10 in a molar ratio. Specifically, the rate of $Li_2S$ to the total of $Li_2S$ and $P_2S_5$ is, for example, in a range of 60 mol % to 90 mol %, preferably in a range of 70 mol % to 80 mol %, more preferably in a range of 72 mol % to 78 mol %, and further preferably in a range of 74 mol % to 76 mol %.

Examples of the shape of the sulfide solid electrolyte may include a granular shape. The average particle size ($D_{50}$) of the granular shaped sulfide solid electrolyte is preferably, for example, in a range of 0.1 μm to 50 μm. Also, the sulfide solid electrolyte preferably has high Li ion conductivity, and the Li ion conductivity at normal temperature is preferably $1×10^{-4}$ S/cm or more, for example, and more preferably $1×10^{-3}$ S/cm or more. Incidentally, for the average particle size, a value calculated with a laser diffraction type particle size distribution meter or a value measured based on an image analysis using an electron microscope such as SEM may be used.

The sulfide solid electrolyte, for example, may be a crystal, may be sulfide glass, and may be glass ceramic. The sulfide solid electrolyte, for example, may include at least one of $Li_2S$ and $P_2S_5$ those are raw materials.

The content of the sulfide solid electrolyte in the raw material mixture to 100 parts by weight of a cathode active material (a sulfur simple substance) is preferably, for example, in a range of 20 parts by weight to 400 parts by weight, and more preferably in a range of 30 parts by weight to 250 parts by weight. When the content of the sulfide solid electrolyte is too little, it may be difficult to make the cathode mixture obtained in the present disclosure to have sufficient ion conductivity. Also, when the content of the sulfide solid electrolyte is too much, the content of the cathode active material will be less so that it may be difficult to secure a sufficient charge-discharge capacity.

(ii) Cathode Active Material

The cathode active material is usually a sulfur simple substance. The sulfur simple substance with purity of high as much as possible is preferably used. Examples of the sulfur simple substance may include $S_8$ sulfur; specifically, examples thereof may include an α sulfur (rhombic sulfur), a β sulfur (monoclinic sulfur), and a γ sulfur (monoclinic sulfur).

The content of the cathode active material in the raw material mixture is preferably, for example, 20% by weight or more, and more preferably 25% by weight or more. Also, the content of the cathode active material in the mixture is preferably, for example, 70% by weight or less, and more preferably 60% by weight or less. When the content of the cathode active material is too little, it may be difficult to secure a sufficient charge-discharge capacity.

(iii) Conductive Aid

A conductive aid is a carbon material used in a mixing step. The conductive aid has a function of improving the electron conductivity of the cathode mixture. Also, it is presumed that the conductive aid functions as a reductant that reduces the sulfur simple substance when the mixture is mixed.

Any carbon materials may be used for the conductive aid, and examples thereof may include vapor-grown carbon fiber (VGCF), acetylene black, activated carbon, furnace black, carbon nanotube, Ketjen black, and graphene.

The content of the conductive aid in the mixture is preferably, for example, in a range of 10 parts by weight to 200 parts by weight, and more preferably in a range of 15 parts by weight to 100 parts by weight, to 100 parts by weight of the cathode active material (sulfur simple substance).

2) Mixing Step

In the mixing step, the cathode mixture is obtained by mixing a raw material mixture including: starting materials of a sulfide solid electrolyte, a cathode active material including a sulfur simple substance, and a conductive aid including a carbon material. Examples of the method for mixing the raw material mixture may include a mechanical milling. The mechanical milling may be a dry mechanical milling and may be a wet mechanical milling.

The mechanical milling is not particularly limited if the method is a method wherein the cathode mixture is mixed while mechanical energy being imparted. Examples thereof may include a ball mill, a vibrating mill, a turbo mill, a mechano-fusion, and a disk mill; above all, a ball mill is preferable, and a planetary type ball mill is particularly preferable.

A liquid used for the wet mechanical milling is preferably aprotic to the extent that hydrogen sulfide is not generated, and specific examples may include aprotic liquids such as a polar aprotic liquid and a non-polar aprotic liquid.

When the planetary type ball mill is used, the cathode mixture and a pulverizing ball are added to a container and treated at a predetermined rotation speed for a predetermined time. A weighing table rotation speed when carrying out the planetary type ball mill is preferably, for example, in a range of 200 rpm to 800 rpm, and more preferably in a range of 300 rpm to 600 rpm. Also, the treating time for carrying out the planetary type ball mill is preferably, for example, in a range of 30 minutes to 100 hours, and more preferably in a range of 5 hours to 60 hours. Also, examples for the material of the container used for the ball mill and of the pulverizing ball may include $ZrO_2$ and $Al_2O_3$. Also, the diameter of the pulverizing ball is, for example, in a range of 1 mm to 20 mm. The mechanical milling is preferably carried out under an inert gas atmosphere (such as Ar gas atmosphere).

3) Cathode Mixture for Sulfur Battery

The cathode mixture in the present disclosure is a material obtained by using above described materials and methods. Specifically, the cathode mixture in the present disclosure is used for a sulfur battery, and is featured by including a composite body obtained by a mechanical milling treatment of a raw material mixture including $Li_2S$ and $M_xS_y$ (M is selected from P, Si, Ge, B, Al, or Sn, and x and y are integers that confer an electroneutrality with respect to S according to a kind of M), a cathode active material including a sulfur simple substance, and a conductive aid including a carbon material.

Also, for the cathode mixture in the present disclosure, when a diffraction intensity of a peak at $2\theta=23.05°\pm1.00°$ is regarded as $I_A$, and a diffraction intensity of a peak at $2\theta=27.05°\pm1.00°$ is regarded as $I_B$, in X-ray diffraction measurement using a $CuK\alpha$ ray, the value of $I_B$ is preferably more than the value of $I_A$.

Further, for the cathode mixture in the present disclosure, it is preferable that the raw material mixture includes $M^1_xS_y$ and $M^2_xS_y$ ($M^1$ and $M^2$ are different elements) as the $M_xS_y$, the $M^1_xS_y$ is $P_2S_5$, the $M^2$ in the $M^2_xS_y$ is selected from Si, Ge, B, Al, or Sn, and an intensity ratio of a diffraction peak of the $Li_2S$ (111) surface to a diffraction peak of the $M^2_xS_y$ (111) surface is 0.9 or more and 10.4 or less.

The cathode mixture is usually used for a cathode layer of a sulfur battery. Therefore, the following may be provided; a method for producing a sulfur battery, the sulfur battery includes a cathode layer, an anode layer, and an electrolyte layer formed between the cathode layer and the anode layer, and the method includes a cathode layer forming step of forming a cathode layer by using the above described cathode mixture. The sulfur battery here refers to a battery using a sulfur simple substance as a cathode active material. For the electrolyte used for the electrolyte layer, for example, a solid electrolyte is preferably used. The solid electrolyte is not particularly limited, and for example, above described sulfide solid electrolyte may be used. The anode active material is not particularly limited, and examples may include metallic lithium and a lithium alloy (such as Li—In alloy). The sulfur battery usually includes a cathode current collector that collects current of the cathode layer and an anode current collector that collects current of the anode layer.

The sulfur battery may be a primary battery or may be a secondary battery. Among the above, the secondary battery is preferable since it may be repeatedly charged and discharged, and is useful as, for example, a car mounted battery. Incidentally, the primary battery includes a usage of a secondary battery as a primary battery (the use for the purpose of just one time discharge after charge). Above all, the sulfur battery is preferably a lithium-sulfur battery.

<X-Ray Diffraction Measurement>

When carrying out an X-ray diffraction (XRD) measurement to the cathode mixture, the measurement is carried out to a powder sample under an inert atmosphere and under conditions using a $CuK\alpha$ ray. For the powder sample to be used for the XRD measurement, for example, the following cathode mixture may be used; the cathode mixture of a battery (produced by the above described method for producing by using the cathode mixture produced by the above described method for producing) after adjusted to the open-circuit voltage (OCV) of 2.2 V (versus $Li/Li^+$) or more and 2.5 V (versus $Li/Li^+$) or less, or a cathode mixture of a charged state battery.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Hereinafter, the present disclosure will be described more specifically with reference to Examples. Incidentally, each operation such as weighing, synthesizing and drying was carried out under Ar atmosphere, unless otherwise indicated.

Example 1 (1 Step)

<Production of Cathode Mixture>

$Li_2S$ (manufactured by Rockwood Lithium Inc.) and $P_2S_5$ (manufactured by Sigma-Aldrich Co. LLC) those are starting materials of a sulfide solid electrolyte, sulfur simple substance powder (manufactured by Kojundo Chemical Lab. Co., Ltd.), and VGCF (conductive aid) were prepared. These starting materials of the raw material mixture were weighed so as to be the weight ratio shown in Table 1, and each material was mixed in an agate mortar for 15 minutes. This raw material mixture was charged into a container (45 cc, made of $ZrO_2$) of a planetary type ball mill, further, $ZrO_2$ balls ($\phi$=4 mm, 96 g) were charged, and the container was completely sealed. This container was attached to a planetary type ball mill machine (P7 manufactured by Fritsch Japan Co., Ltd), and a cycle of mechanical milling for 1 hour at weighing table rotation speed of 500 rpm and 15 minutes at rest was repeated to carry out a mechanical milling for total of 48 hours. As described above, a cathode mixture was obtained.

Incidentally, the production method (flow of synthesis) of a cathode mixture in Example 1 is referred to as 1 step, and the flow of the production method is shown in FIG. 1.

The weight of each material used as the starting material and the open-circuit voltage (OCV) of the produced cell are shown in Table 1.

TABLE 1

| | Flow of synthesis | Starting materials [g] | | | | OCV |
| | | Li$_2$S | P$_2$S$_5$ | S | Carbon (VGCF) | |
|---|---|---|---|---|---|---|
| Example 1 | 1 step | 0.528 | 0.852 | 1.05 | 0.57 | 2.3 V |
| Comparative Example | 2 step | 0.528 | 0.852 | 1.05 | 0.57 | 2.4 V |

<Fabrication of Battery>

A Li metal foil was prepared as an anode layer.

100 mg of the solid electrolyte was placed in 1 cm$^2$ ceramic mold and pressed under 1 ton/cm$^2$ so as to pressure powder mold the solid electrolyte layer. 7.8 mg of the cathode mixture was placed on one side of the above and pressed under 6 ton/cm$^2$ to produce a cathode layer. On the other side, the lithium metal foil was placed as an anode layer and pressed under 1 ton/cm$^2$ to obtain an electric generating element. An Al foil (cathode current collector) was placed on the cathode layer side, and a Cu foil (anode current collector) was placed on the abode layer side. By the above described procedures, a battery was produced.

Comparative Example (2 Step)

<Production of Solid Electrolyte>

Li$_2$S (manufactured by Rockwood Lithium Inc.) and P$_2$S$_5$ (manufactured by Sigma-Aldrich Co. LLC) were used as starting materials. Li$_2$S and P$_2$S$_5$ were weighed so as to be Li$_2$S:P$_2$S$_5$=75:25 in the molar ratio according to the weight ratio shown in Table 1, and each material was mixed in an agate mortar for 15 minutes. The mixture was charged into a container (45 cc, made of ZrO$_2$) of a planetary type ball mill, further, ZrO$_2$ balls ($\phi$=4 mm, 96 g) were charged, and the container was completely sealed. This container was attached to a planetary type ball mill machine (P7 manufactured by Fritsch Japan Co., Ltd), and a cycle of mechanical milling for 1 hour at weighing table rotation speed of 500 rpm and 15 minutes at rest was repeated to carry out a mechanical milling for total of 24 hours. As described above, a solid electrolyte was obtained.

<Production of Cathode Mixture>

Sulfur simple substance powder (manufactured by Kojundo Chemical Lab. Co., Ltd.) and VGCF (conductive aid) were prepared. These starting materials were weighed so as to be the weight ratio shown in Table 1, charged into the container of a planetary type ball mill in which the solid electrolyte was produced, and the container was completely sealed. This container was attached to a planetary type ball mill machine (P7 manufactured by Fritsch Japan Co., Ltd), and a cycle of mechanical milling for 1 hour at weighing table rotation speed of 500 rpm and 15 minutes at rest was repeated to carry out a mechanical milling for total of 24 hours. As described above, a cathode mixture was obtained.

Figure 2:
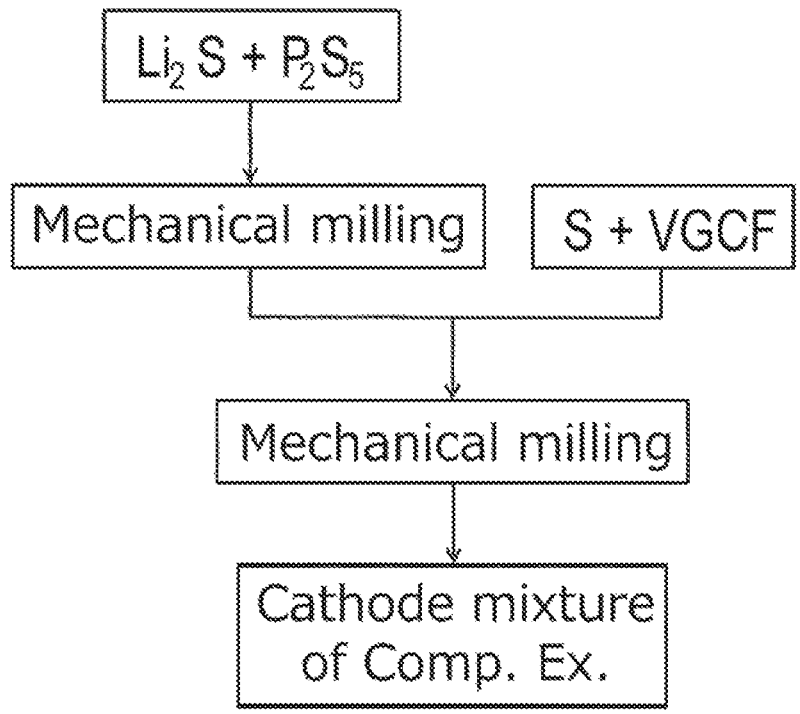
FIG. 2 is a diagram for explaining the flow of the method for producing in Comparative Example of the present disclosure.

Incidentally, the production method. (flow of synthesis) of a cathode mixture in Comparative Example is referred to as 2 step, and the flow of the production method is shown in FIG. 2.

<Fabrication of Battery>

A battery was obtained by fabricating a battery in the same manner as in Example 1.

[Evaluation]

<Open-Circuit Voltage Measurement>

The open-circuit voltage (OCV) of each produced battery was measured after one minute or more after the battery was produced. Each OCV value of the batteries of Example 1 and Comparative Example is Shown in Table 1.

<X-Ray Diffraction Measurement>

An X-ray diffraction (XRD) measurement was carried out by using each cathode mixture produced in Example 1 and Comparative Example. The XRD measurement was carried out to a powder sample under an inert atmosphere and under conditions using a CuK$\alpha$ ray. For the powder samples used for XRD measurement, the cathode mixtures produced by the production method described in Example 1 and Comparative Example were used.

Figure 3A:
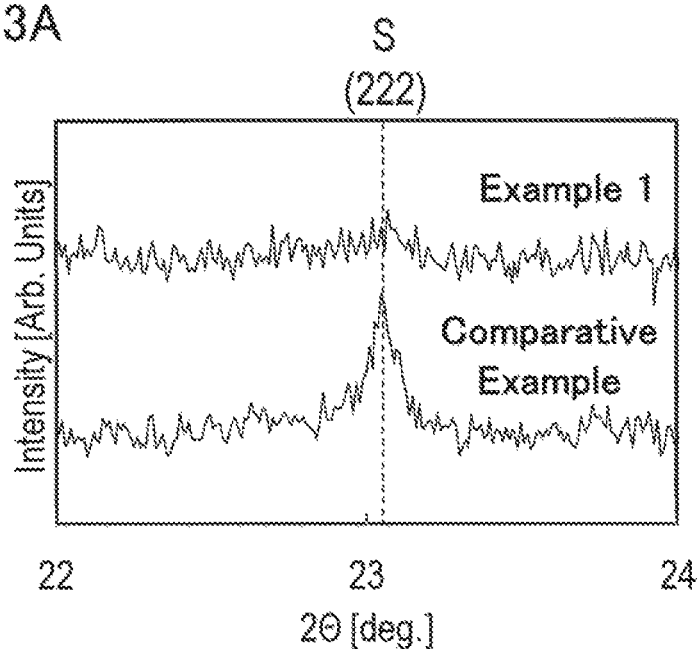
FIG. 3A is a diagram showing XRD patterns in the vicinity of 2θ=23° of the cathode mixture powder produced by the processes in Example 1 and Comparative Example.

As shown in FIG. 3A, for Example 1, a diffraction peak that belongs to the (222) surface of sulfur was not observed in the vicinity of 23.05°, meanwhile, for Comparative Example, this diffraction peak that belongs to the (222) surface of sulfur was observed. By this, it is presumed that the sulfur particle is highly dispersed in the cathode mixture so that the crystallinity of the sulfur was decreased, by applying the flow of synthesis (1 step) of Example 1 to the production process of a cathode mixture of a sulfur battery.

Figure 3B:
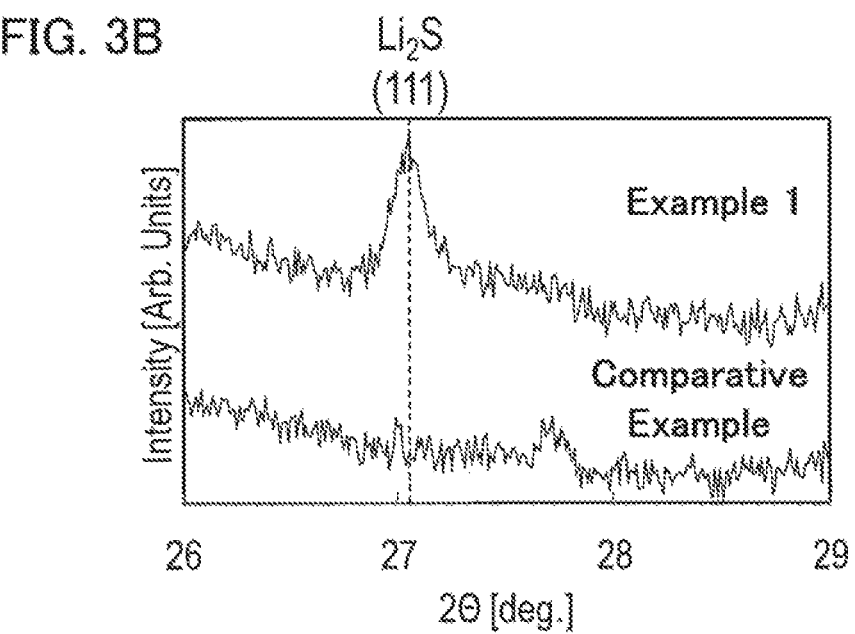
FIG. 3B is a diagram showing XRD patterns in the vicinity of 2θ=27° of the cathode mixture powder produced by the processes in Example 1 and Comparative Example.

From FIGS. 3A and 3B, when the diffraction intensity of the peak in the vicinity of 2θ=23.05° is regarded as I$_A$, and the diffraction intensity of the peak in the vicinity of 2θ=27.05° that belongs to (111) surface of Li$_2$S is regarded as I$_B$, in X-ray diffraction measurement using a CuK$\alpha$ ray, it was confirmed that the value of I$_B$ (from the diffraction peak shown in FIG. 3B, I$_B$=1364 in Example 1) was more than the value of I$_A$ (from the diffraction peak shown in FIG. 3A, I$_A$=1273 in Example 1) in Example 1. Meanwhile, unlike Example 1, it was confirmed that the value of I$_B$ was less that the value of I$_A$ in Comparative Example. By this, it was confirmed that the crystallinity of Li$_2$S in the cathode mixture were also different in Example 1 and Comparative Example. Therefore, it is presumed that the sulfur simple substance and Li$_2$S were redeposited on the surface of the solid electrolyte by applying the flow of synthesis (1 step) of Example 1 to the production process of a cathode mixture of a sulfur battery.

<Reversible Capacity Density Measurement>

Figure 4:
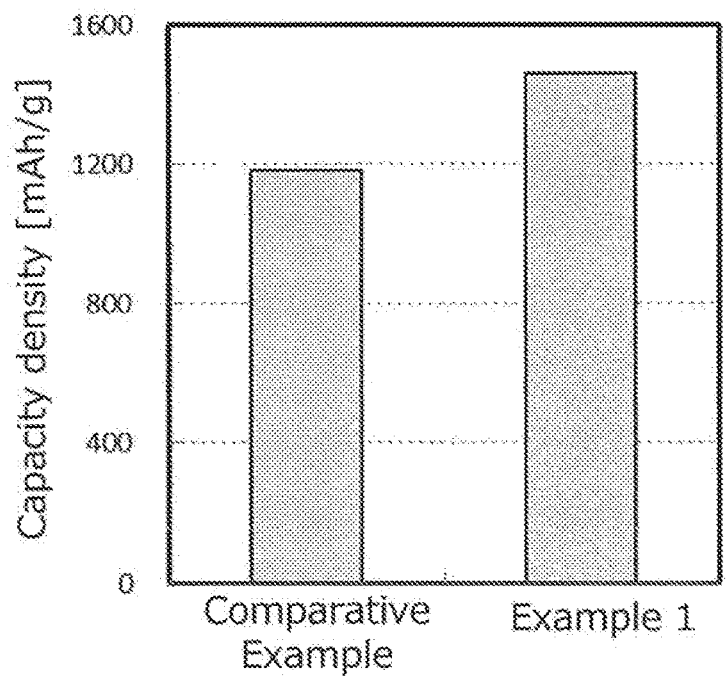
FIG. 4 is a diagram showing the reversible capacity densities when charged and discharged at C/10 (456 µA/cm²) in Example 1 and Comparative Example.

Each all solid state battery obtained in Example 1 and Comparative Example was discharged until 1.5 V (versus. Li/Li$^+$) in the first cycle at a constant current value (C/10: 456 μA/cm$^2$), charged until 3.1 V (versus Li/Li$^+$), and then, discharged until 1.5 V (versus Li/Li$^+$) in the second cycle. The values of capacity density (reversible capacity density: mAh/g) when discharged until 1.5 V in the second cycle are shown in FIG. 4. The charge and the discharge were carried out at temperature of 25° C. Incidentally, C rate refers to the value of current of the capacity of the battery discharged in one hour, and the value of current at 1C of the battery produced in the present disclosure was 4.56 mA/cm$^2$.

The values of reversible capacity density in Example 1 and Comparative Example are shown in FIG. 4. Form FIG. 4, it was confirmed that the reversible capacity density in Example 1 was more compared to Comparative Example. From this result, it is presumed that, in Example 1, an excellent three-phase interface, wherein the solid electrolyte forming a Li ion path and the conductive aid forming an electron path coexist, is formed on the surface of the sulfur being an active material so that the charge-discharge reaction may be promoted when charged and discharged, and it was possible to increase the charge-discharge capacity of the sulfur battery.

<Reversible Capacity Measurement when Charged and Discharged at Different C Rate>

Each all solid state battery obtained in Example 1 and Comparative Example was charged at current value of C/10, and then discharged at different C rate (current value of C/3, 1C and 2C). The values of discharge property (high-rate discharge property: %), whose numerator is the discharge capacity when discharged at the above described different C rates and denominator is the discharge capacity (discharged until 1.5 V at current value of C/10) Of the second cycle when measuring the reversible capacity density, are shown in FIG. 5.

The charge and the discharge were carried out at temperature of 25° C., in a potential range of 1.5 V to 3.1 V (versus Li/Li$^+$).

Figure 5:
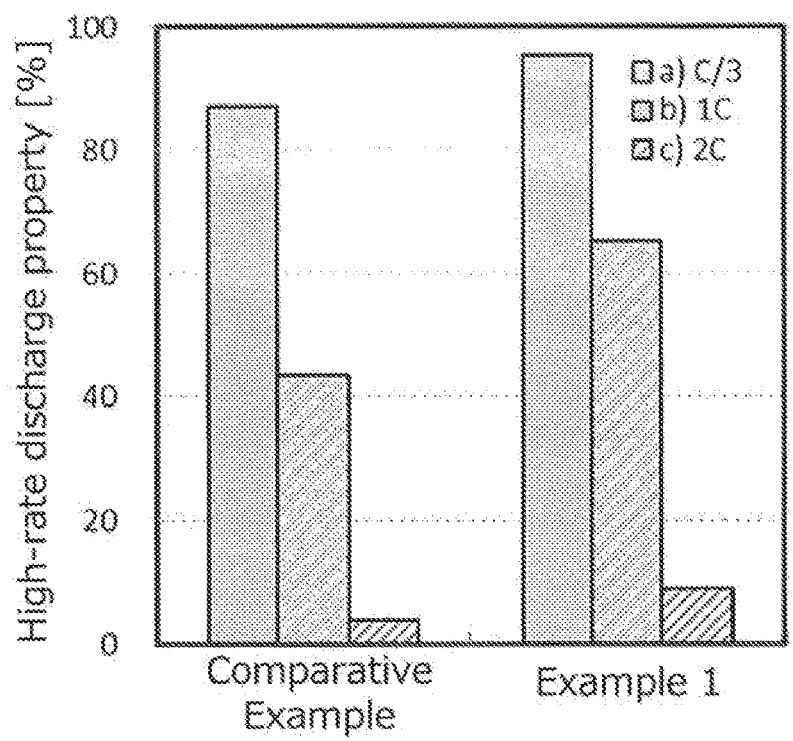
FIG. 5 is a diagram showing the rate of the reversible capacity densities when charged and discharged at a) C/3, b) 1C, and c) 2C, to that of C/10 (456 µA/cm²) in Example 1 and Comparative Example.

The values of the high-rate discharge property in Example 1 and Comparative Example are shown in FIG. 5. From FIG. 5, it was confirmed that the discharge property at each C rate (current value of C/3, 1C and 2C) in Example 1 was more compared to Comparative Example.

The reason why the discharge property is high in Example 1 is presumed as follows.

From the results of XRD measurement, it was recognized that the sulfur particle was highly dispersed in the cathode mixture so that the crystallinity of the sulfur was decreased, by applying the flow of synthesis (1 step) of Example 1 to the production process of a cathode mixture of a sulfur battery. Therefore, during the Cathode mixture production in Example 1, it is presumed that, since a part of the sulfur or a lithium polysulfide (Li$_2$S) generated by the reaction of the sulfur and Li$_2$S, was incorporated into the structure of the solid electrolyte during the synthesis of the solid electrolyte, and the sulfur or Li$_2$S that has become the solid-solution limit was redeposited on the solid electrolyte so that the contacting parts between the solid electrolyte and the active material were increased.

Examples 2 to 7

<Production of Cathode Mixture>

Li$_2$S (manufactured by Rockwood Lithium Inc.) and P$_2$S$_5$ (manufactured by Sigma-Aldrich Co. LLC) those are starting materials of the sulfide solid electrolyte, sulfur simple substance powder (manufactured by Kojundo Chemical Lab Co., Ltd.), GeS$_2$, and VGCF (conductive aid) were prepared. These starting materials of the raw material mixture were weighed so as to be the weight ratio shown in Table 2, and each material was mixed in an agate mortar for 15 minutes. This raw material mixture was charged into a container (45 cc, made of ZrO$_2$) of a planetary type ball mill that was preliminarily dried under reduced pressure at 150° C. all through the night, further, ZrO$_2$ balls (ϕ=4 mm, 96 g, 500 balls) those were preliminarily dried under reduced pressure at 150° C. all through the night were charged, and the container was completely sealed. This container was attached to a planetary type ball mill machine (P7 manufactured by Fritsch Japan Co., Ltd), and a cycle of mechanical milling for 1 hour at weighing table rotation speed of 500 rpm and 15 minutes at rest was repeated to carry out a mechanical milling for total of 48 hours. After the mechanical milling, the container was transferred into a glove box and the sample was collected. Incidentally, the sample attached to the ZrO$_2$ balls was collected by sifting by charging into a shifter, and the sample attached to the container was collected by scraping with a scoopula. As described above, a cathode mixture was obtained.

Figure 6:
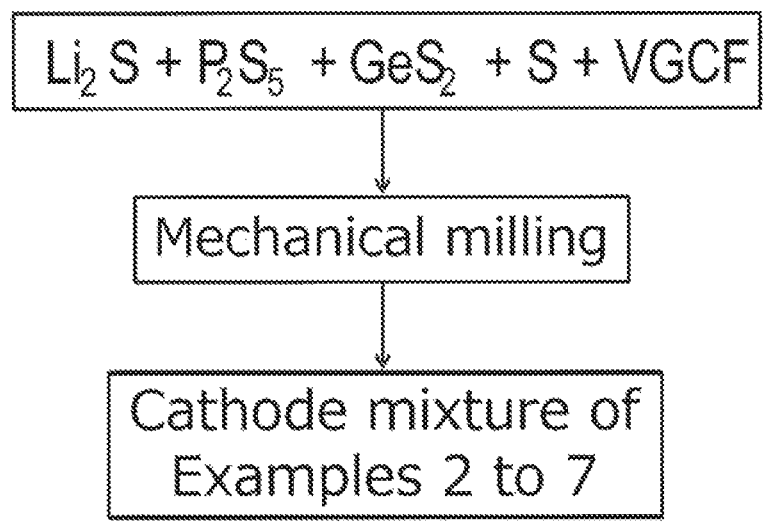
FIG. 6 is a diagram for explaining the flow of the method for producing in Examples 2 to 7 of the present disclosure.

Incidentally, the production method (flow of synthesis) of a cathode mixture in Examples 2 to 7 is referred to as 1 step, and the flow of the production method is shown in FIG. 6.

<Fabrication of Battery>

By using the obtained cathode mixture, each battery was produced in the same manner as in Example 1.

Reference Example

<Production of Cathode Mixture>

A cathode mixture was obtained in the same manner as in Examples 2 to 7 except that the raw material mixture did not include GeS$_2$.

<Fabrication of Battery>

By using the obtained cathode mixture, each battery was produced in the same manner as in Example 1.

The weight of each material used as the starting materials, the molar ratio between Li and P (Li/P) in the raw material mixture, and the molar ratio between Ge and P (Ge/P) in the raw material mixture in Examples 2 to 7 and Reference Example are shown in Table 2.

TABLE 2

| | Starting materials [g] | | | | | | |
|---|---|---|---|---|---|---|---|
| | Li$_2$S | P$_2$S$_5$ | GeS$_2$ | S | VGCF | Li/P | Ge/P |
| Reference Example | 0.71 | 0.67 | 0.00 | 1.05 | 0.57 | 5.16 | 0.00 |
| Example 2 | 0.68 | 0.64 | 0.06 | 1.05 | 0.57 | 5.16 | 0.08 |
| Example 3 | 0.59 | 0.56 | 0.23 | 1.05 | 0.57 | 5.16 | 0.34 |
| Example 4 | 0.54 | 0.51 | 0.34 | 1.05 | 0.57 | 5.16 | 0.54 |
| Example 5 | 0.49 | 0.46 | 0.44 | 1.05 | 0.57 | 5.16 | 0.79 |
| Example 6 | 0.45 | 0.42 | 0.51 | 1.05 | 0.57 | 5.16 | 1.00 |
| Example 7 | 0.41 | 0.39 | 0.58 | 1.05 | 0.57 | 5.16 | 1.23 |

EVALUATION

<Property Evaluation of Cathode Mixture>

The property evaluation of the cathode mixture was carried out for each battery obtained in Examples 2 to 7 and Reference Example. The flow of the property evaluation is as follows.

(1) OCV measurement (one minute)

(2) Discharge until 1.5 V at C/10, and then, rest for 10 minutes.

(3) Discharge until 3.1 V at C/10, and then, rest for 10 minutes, after that, a cycle of discharge until 1.5 V at C/10 and 10 minutes at rest was carried out for total of 5 times.

(4) Discharge until 3.1 V at C/10, and then, rest for 10 minutes. Then, discharge until 1.5 V at C/3, and then, rest for 10 minutes, after that, discharge until 1.5 V at C/10, and then, rest for 10 minutes.

(5) Discharge until 3.1 V at C/10, and then, rest for 10 minutes. Then, discharge until 1.5 V at 1C, and then, rest for 10 minutes, after that, discharge until 1.5 V at C/10, and then, rest for 10 minutes.

(6) Discharge until 3.1 V at C/10, and then, rest for 10 minutes. Then, discharge until 1.5 V at 2C, and then, rest for 10 minutes, after that, discharge until 1.5 V at C/10, and then, rest for 10 minutes.

(7) Discharge until 3.1 V at C/10, and then, rest for 10 minutes, then, discharge until 1.5 V at C/10, and then, rest for 10 minutes.

Incidentally, the value of current at 1C of the battery produced in the present disclosure was 4.56 mA/cm$^2$.

Figure 7:
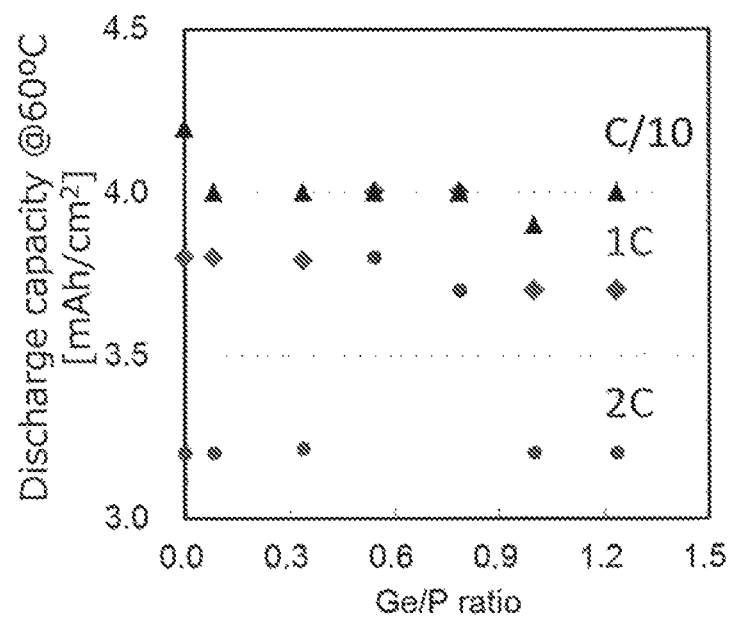
FIG. 7 is a graph showing discharge capacities at C/10, 1C, 2C of the batteries using the cathode mixtures obtained in Examples 2 to 7 and Reference Example.
Figure 8:
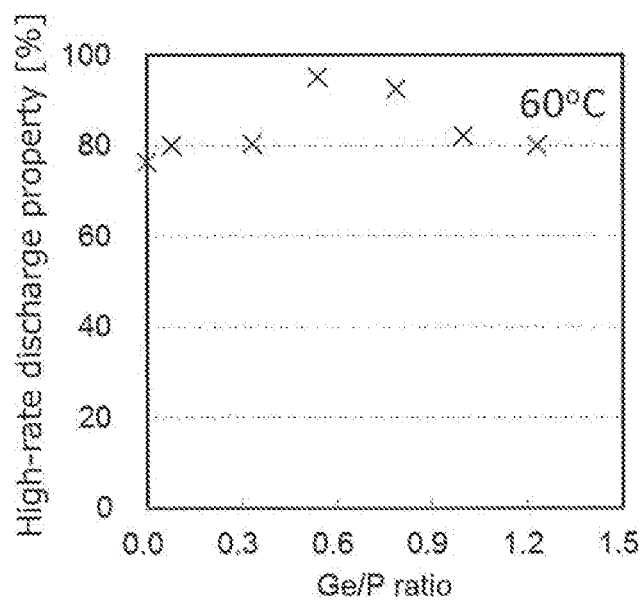
FIG. 8 is a graph showing the rates of discharge property at 2C to discharge capacity at C/10 (high-rate discharge property) of the batteries using the cathode mixtures obtained in Examples 2 to 7 and Reference Example.

The discharge capacity at C/10, 1C, 2C (corresponds to the fifth cycle of flow of the property evaluation (3), (5), (6)) and the high-rate discharge property (rate of the discharge capacity at 2C to the discharge capacity at 0.1 C) of each battery using the cathode mixture obtained in Examples 2 to 7 and Reference Example are shown in Table 3 and FIGS. 7 and 8.

TABLE 3

| | Intensity ratio (diffraction peak of (111) surface of Li$_2$S/diffraction peak of (111) surface of GeS$_2$) | 60° C. [mAh/cm$^2$] | | | |
|---|---|---|---|---|---|
| | | 0.1 C | 1 C | 2 C | 2 C/ 0.1 C |
| Reference Example | 20.5 | 4.2 | 3.8 | 3.2 | 76 |
| Example 2 | 10.4 | 4.0 | 3.8 | 3.2 | 80 |
| Example 3 | 4.7 | 4.0 | 3.8 | 3.2 | 80 |
| Example 4 | 4.0 | 4.0 | 4.0 | 3.8 | 95 |
| Example 5 | 2.0 | 4.0 | 4.0 | 3.7 | 93 |
| Example 6 | 1.1 | 3.9 | 3.7 | 3.2 | 82 |
| Example 7 | 0.9 | 4.0 | 3.7 | 3.2 | 80 |

As shown in Table 3 and FIG. 7, although the discharge capacity is slightly decreased by adding GeS$_2$ at low current density (C/10), there was no big difference between Reference Example and Examples 2 to 7. Meanwhile as shown in Table 3 and FIG. 8, there were differences between Reference Example and Examples 2 to 7 when discharged at high current density (1C). Specifically, by adding GeS$_2$, the capacity decrease at high current density may be suppressed, and particularly, the above described effect was remarkable by using the cathode mixture of Examples 4 and 5 whose Ge/P was 0.54 or more and 0.79 or less. The battery using the cathode mixture exhibiting such effect is preferably used under use condition wherein the output (load) variation is drastic, particularly such as a car-mounted application, and has an advantage that the capacity variation is small.

<Structural Analysis of Cathode Mixture>

Figure 9:
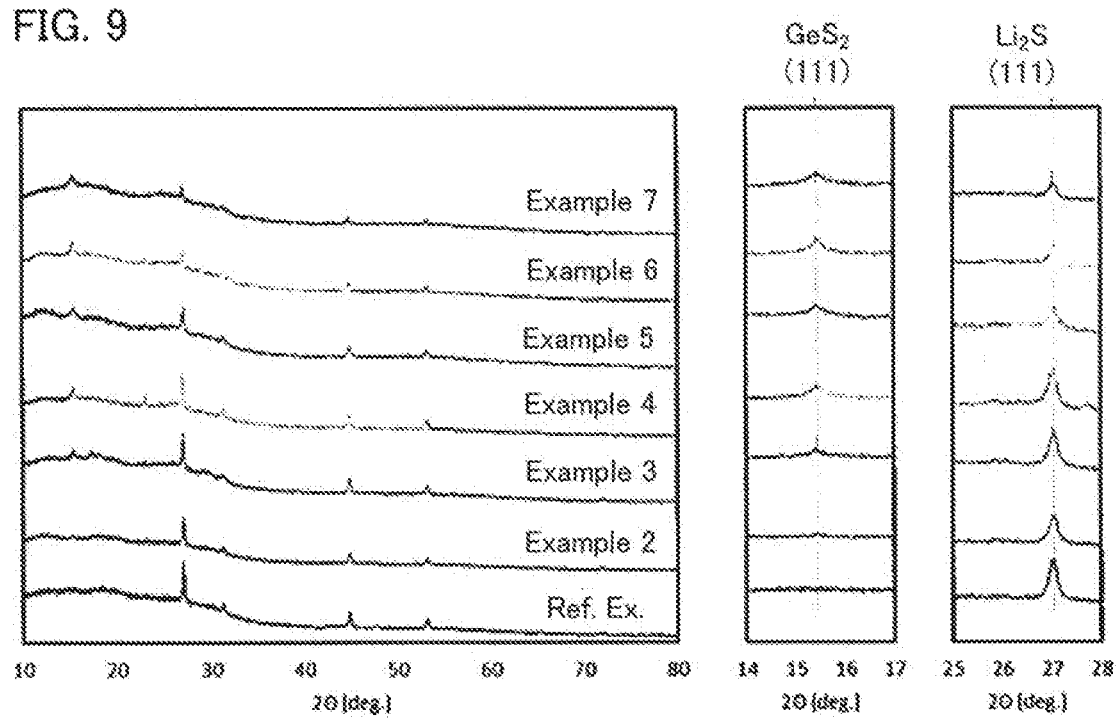
FIG. 9 shows XRD patterns of the cathode mixtures obtained in Examples 2 to 7 and Reference Example.
Figure 10:
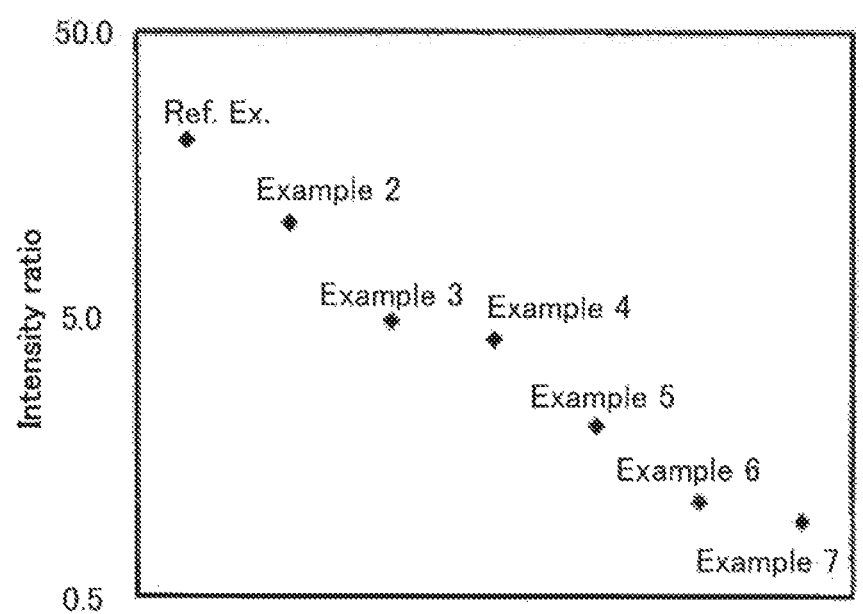
FIG. 10 is a graph showing the intensity ratios of $Li_2S$ (111)/$GeS_2$ (111) of the cathode mixtures obtained in Examples 2 to 7 and Reference Example.

For each cathode mixture obtained in Examples 2 to 7 and Reference Example, a structural analysis was carried out by using XRD diffraction measurement device manufactured by Rigaku Corporation. The measurement was carried out by cumulating for three times, using a CuKα ray, in a range of 2θ=10° to 80° at scanning rate of 10°/minute. The XRD patterns of each cathode mixture obtained in Examples 2 to 7 and Reference Example are shown in FIG. 9, and the intensity ratios of Li$_2$S (111)/GeS$_2$ (111) are shown in Table 3 and FIG. 10. Incidentally, since the calculating method of the intensity ratio may be similar to those explained in the section of "1) Raw material mixture" above, the explanation is omitted herein.

For each cathode mixture obtained in Examples 2 to 7, the raw material mixture includes Li$_2$S, P$_2$S$_5$, sulfur simple substance powder, GeS$_2$, and VGCF. As shown in FIG. 9, since the raw material mixtures in Examples 2 to 7 includes GeS$_2$, the excessive Li$_2$S is bonded to GeS$_2$ so that the Li$_2$S intensity was decreased, meanwhile, the GeS$_2$ intensity was increased by increasing the compensating amount of GeS$_2$ so that the unreacted GeS$_2$ was increased. Also, it is presumed that the excessive GeS$_2$ functions as the active material although at low doses, Whereas the excessive Li$_2$S has no ion conductivity being a resistor. As the result, it is presumed that, by adding GeS$_2$ to the raw material mixture, the decrease in capacity may be suppressed since the resistance is low at high rate, although the contribution of the resistance increase does not appear at low rate so that the capacity decreases in some cases.

What is claimed is:

1. A method for producing a cathode mixture used for a sulfur battery, the method comprising:
    forming a raw material mixture by combining as separate starting materials each of
        (1) Li$_2$S,
        (2) P$_2$S$_5$ and GeS$_2$,
        (3) a cathode active material comprising a sulfur simple substance, and
        (4) a conductive aid comprising vapor-grown carbon fiber, the raw material mixture comprised of each of the separate starting materials, and
    mechanical milling the raw material mixture to produce the cathode mixture,
    wherein, in the produced cathode mixture, when a diffraction intensity of a peak at 2θ=23.05°±1.00° is regarded as I$_A$, and a diffraction intensity of a peak at 2θ=27.05°±1.00° is regarded as I$_B$, in X-ray diffraction measurement using a CuKα ray, a value of I$_B$ is more than a value of I$_A$;
    wherein the raw material mixture comprises the Li$_2$S and the P$_2$S$_5$ at a rate in a range of 75:25 to 90:10 in a molar ratio;
    wherein an atomic ratio of the Ge to the P in the raw material mixture is 0.08 or more and 1.23 or less; and
    wherein an intensity ratio of a diffraction peak of the Li$_2$S (111) surface to diffraction peak of the GeS$_2$ (111) surface in the cathode mixture is 0.9 or more and 10.4 or less.

2. The method according to claim 1, wherein the mechanical milling treatment is carried out by using a planetary type ball mill.

* * * * *